United States Patent [19]

Otsuka et al.

[11] Patent Number: 4,789,910
[45] Date of Patent: Dec. 6, 1988

[54] THIN FILM MAGNETIC HEAD WITH AN APPLICATION TYPE SILICON DIOXIDE FILM

[75] Inventors: Kozi Otsuka, Yamatokoriyama; Tohru Kira, Tenri; Kazuyoshi Imae, Higashiosaka; Mitsuhiko Yoshikawa, Ikoma, all of Japan

[73] Assignee: Sharp Kabushiki Kaisha, Osaka, Japan

[21] Appl. No.: 855,934

[22] Filed: Apr. 25, 1986

[30] Foreign Application Priority Data

Apr. 26, 1985 [JP] Japan .................................. 60-91667
Apr. 26, 1985 [JP] Japan .................................. 60-91668

[51] Int. Cl.$^4$ ............................ G11B 5/30; G11B 5/12
[52] U.S. Cl. ....................................... 360/113; 360/125
[58] Field of Search ............. 360/113, 125; 338/32 R

[56] References Cited

U.S. PATENT DOCUMENTS

| 4,354,212 | 10/1982 | Norimoto et al. | 360/113 |
| 4,356,523 | 10/1982 | Yeh | 360/113 |
| 4,639,806 | 1/1987 | Kira et al. | 360/113 |
| 4,679,107 | 7/1987 | Imakoshi et al. | 360/113 |

FOREIGN PATENT DOCUMENTS

| 0124293 | 7/1984 | European Pat. Off. . |
| 1539174 | 1/1979 | United Kingdom . |
| 2003647 | 3/1979 | United Kingdom . |
| 2012095 | 7/1979 | United Kingdom . |
| 2105093 | 3/1983 | United Kingdom . |

Primary Examiner—John H. Wolff
Attorney, Agent, or Firm—Birch, Stewart, Kolasch & Birch

[57] ABSTRACT

A thin film magnetic head which comprises an end portion of a first yoke and an end portion of a second yoke confronting each other through a magnetic gap, and receiving from a recording surface or a recording medium, a magnetic signal, and a magnetic reluctance effect element disposed for magnetic coupling in the course of a magnetic path constituted by the first and second yokes. The thin film magnetic head is characterized in that the first yoke or magnetic reluctance effect element is formed on an application type $SiO_2$ film which improves the surface roughness of the ground layer.

20 Claims, 3 Drawing Sheets

THIN FILM MAGNETIC HEAD WITH AN APPLICATION TYPE SILICON DIOXIDE FILM

BACKGROUND OF THE INVENTION

The present invention generally relates to a magnetic head and more particularly, to a thin film magnetic head (referred to as a thin film MR head hereinafter) that is provided with a magnetic reluctance effect element (referred to as an MR element hereinafter) which is adapted to detect variation of a magnetic field signal that is applied in a direction to the axis that is difficult to magnetize, of a strong magnetic material i.e. ferromagnetic thin film having a uniaxial magnetic anisotropy, so as the axis becomes easier to magnetize, thereby effecting the detection of recorded signals on a magnetic recording medium.

Conventionally, the thin film MR head has been known to have many advantages as compared with a wound type magnetic head. Such a thin film MR head is arranged so that the magnetizing direction in the MR element is altered upon the receipt of a magnetic field signal that is written in a magnetic recording medium such as a magnetic tape or the like, and the variation of an internal resistance of the MR element, in accordance with the variation in the above magnetizing direction, is provided as an external output. Therefore, the thin film MR head is a magnetic flux responding type head, and the thin film MR is capable of reproducing the magnetic field signal, without depending on the transfer speed of the magnetic recording medium. Since the thin film MR head may be readily formed into a highly integrated structure or a multi-element structure, it is possible that the thin film MR head can replace the reproduction magnetic head of a fixed head type PCM recording apparatus intended for a high density recording.

Originally, owing to the fact that the MR element has an induction characteristic showing a square variation with respect to the external magnetic field, in the case where the MR element is constituted as a reproduction head, it is necessary to form the MR element into a stripe shape, and also provide the element with a structure that is applied with a predetermined biasing magnetic field in order to achieve a linear response characteristic. To impress the biasing magnetic field as referred to above, the practice of inducing the biasing magnetic field by causing DC current to flow through a conductor has been known, and another practice of impressing the biasing magnetic field by having a high resistance against magnetic force through the employment of a thin film such as Co-P layer, etc. (Reference may be made to Japanese Patent Application Tokugansho No. 55-126255 and the excerpt from 4th scientific lectures of the Japan Applied Magnetics Society (1980) 5PA-4 entitled "Multi-track Thin Film MR Head") is also known. For the actual application, in the thin film MR head, the MR element is formed on the conductor or thin film with a high resistance against magnetic force as referred to above, through an insulating layer.

Meanwhile, it has been known that a thin film magnetic head normally called a yoke type MR head (referred to as a YMR head hereinafter) can be provided with a magnetic flux introducing path (referred to as a yoke hereinafter) for leading magnetic fluxes that are produced in the magnetic recording medium towards the MR element spaced from the forward end of the head (FIG. 6). A yoke type MR head is more effective for improvements in resolving the signal power and the durability of the MR elements, than an MR head constituted by a single MR element. (Reference may be made to the excerpt from 8th scientific lectures of the Japan Applied Magnetics Society (1984) 14PB-11 entitled "Reproduction Characteristics of Yoke Type MR Heads").

In FIG. 6, a side sectional view of a conventional YMR head is shown (yoke type thin film magnetic head) when taken in a direction perpendicular to a track width direction of a magnetic recording medium.

In FIG. 6, an upper yoke Yu is provided that is normally prepared by a film of permalloy (Ni-Fe alloy) having a thickness in the range of about 0.5 to 1.0 $\mu$m so as to serve as a magnetic path for leading the magnetic field generated in a magnetic recording medium R to an MR element H. The MR element H is formed by a deposition film of permalloy (Ni-Fe alloy referred to above) and set for a film thickness in the range of about 200 to 500 Å, with the track width in the range of about 50 to 200 $\mu$m in a multi-track construction. Moreover, for the application of a biasing magnetic field, a conductor C made of a film of Al and Cu or an Al-Cu alloy, etc. is provided for the application of a biasing magnetic field. Since an actually used recording wavelength actually used is in the order of about 0.5 $\mu$m, a head gap G is set in the range of approximately 0.2 to 0.3 $\mu$m. The conductor C, MR element H and upper yoke YU as described above are formed respectively through insulating layers L1, L2 and L3 as illustrated. Also formed on a non-magnetic substrate S, for example of crystallized glass, is a lower yoke YL made of a high permeability magnetic film such as a sendust (Fe-Al-Si alloy) film or permalloy by an electron beam deposition process or sputtering, etc.

Since the lower yoke YL made of the high permeability magnetic film requires a film thickness of approximately several $\mu$m from the functioning viewpoint of the YMR head, it is needless to say that a thermal expansion coefficient of the substrate S should be in agreement with that of the high permeability magnetic film in order to obtain favorable characteristics of the above magnetic film.

For achieving still better magnetic characteristics, it is necessary that the substrate S has a small surface roughness. However, the surface roughness of crystallized glass generally available is in the range of about 50 to 200 Å, and if the high permeability magnetic film is formed on such crystallized glass, the orientation of crystals for the magnetic film will tend to vary, thus making it impossible to obtain the desired magnetic characteristics. Meanwhile, the surface roughness of the high permeability magnetic film formed on the crystallized glass substrate is similar to that of the substrate S, and falls in the range of about 50 to 200 Å in reflection of the surface roughness of said substrate. As a result, at the head gap portion G, the processing accuracy for the gap length is lowered by the undulation on the surface of the lower yoke YL, while characteristic variation in the magnetic film forming the upper yoke YU are undesirably brought about. Furthermore, since a back yoke portion YB is coupled with the lower yoke YL in a state where non-uniformity in crystallinity, etc. takes place, magnetic behaviors becomes uncontinuous, thus making it impossible to obtain favorable magnetic characteristics. Accordingly, in the YMR head as described so far, the influence of noises peculiar to the ferromagnetic member and the influence of strain in the signal waveforms, over S/N ratios of reproduction waveforms are brought as serious problems.

SUMMARY OF THE INVENTION

Accordingly, an essential object of the present invention is to provide an improved thin film magnetic head which is capable of achieving favorable magnetic characteristics of the upper and lower yokes, even when a substrate thereof has a great amount of surface roughness.

Another important object of the present invention is to provide a thin film magnetic head of the type described above which is so arranged that favorable magnetic characteristics of an MR element may be obtained even in the presence of a conductive layer.

A further object of the present invention is to provide a thin film magnetic head of the type described above which is provided with a yoke contacting a magnetic recording medium and formed above or below a head gap portion, and a magnetic reluctance effect element magnetically coupled through the yoke as a magnetic path, and characterized in that said yoke is provided via a $SiO_2$ film formed on the substrate by an application process on the substrate.

Still another object of the present invention is to provide a thin film magnetic head of the type described above which is arranged to detect variations of a magnetic field signal applied in a direction that is difficult to be magnetized by a ferromagnetic thin film having a uniaxial magnetic anisotropy, as a variation of electric resistance, and characterized in that said ferromagnetic thin film is provided on the $SiO_2$ film formed on an insulating layer through an application process.

In accomplishing these and other objects, according to one preferred embodiment of the present invention, a thin film magnetic head is provided which is so constructed that a yoke contacting a magnetic recording medium is formed at the upper or lower portion of a head gap while a magnetic reluctance effect element is magnetically coupled with said yoke as a magnetic path is provided therein, and is characterized in that said yoke is formed through the $SiO_2$ film applied on the substrate through an application process.

By the arrangement of the present invention as described above, an improved thin film magnetic head has been advantageously presented through a simple construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
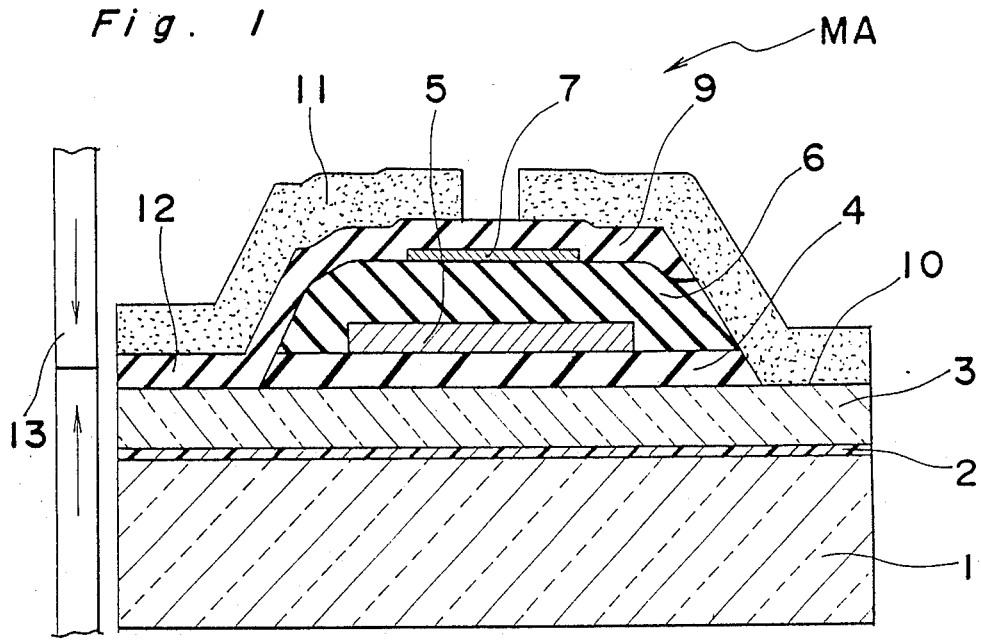
FIG. 1 is a side sectional view of a thin film magnetic head according to one preferred embodiment of the present invention as taken along the line I—I in FIG. 2.

Before the description of the present invention proceeds, it is to be noted that like parts are designated by like reference numerals throughout the accompanying drawings.

Figure 2:
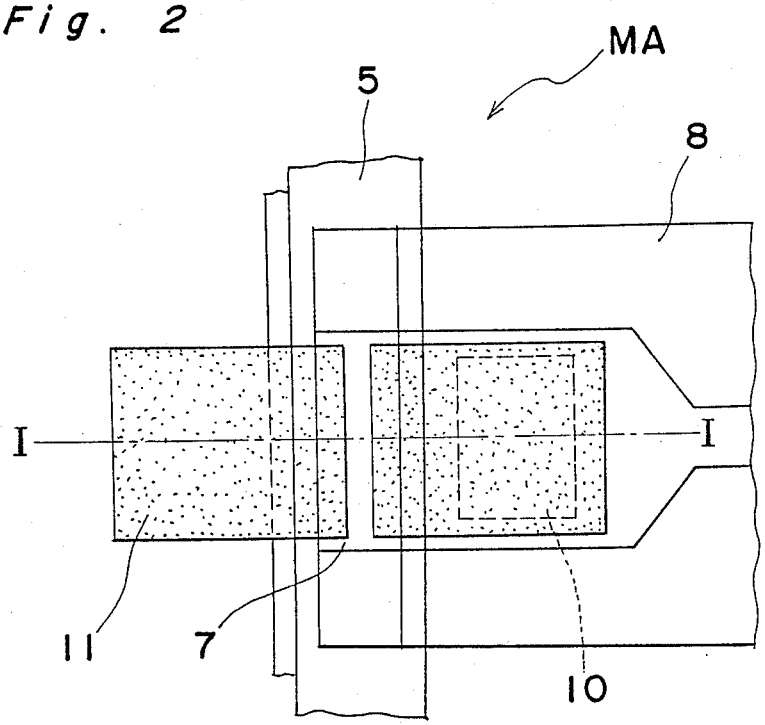
FIG. 2 is a fragmentary top plan view of the thin film magnetic head shown in FIG. 1.

Referring now to the drawings, FIGS. 1 and 2 show a thin film magnetic head MA according to one preferred embodiment of the present invention.

In FIGS. 1 and 2, the thin film magnetic head MA which comprises a substrate 1 of a non-magnetic material, an application type $SiO_2$ film 2 formed on said substrate 1, a lower yoke 3 of a high permeability magnetic film formed on said $SiO_2$ layer 2, a first insulating layer 4 formed on said lower yoke 3, a conductor layer 5 formed on said first insulating layer 4, a second insulating layer 6 formed on said conductor layer 5, an MR element 7 and a lead layer 8 further formed on said second insulating layer 6, a third insulating layer 9 formed on said MR element 7 and lead layer 8, and an upper yoke 11 finally formed on said third insulating layer 9, with a head gap portion 12 and a back yoke portion 10 being formed between said upper yoke 11 and said lower yoke 3.

The upper yoke 11 is composed of a high permeability film of permalloy (Ni-Fe alloy) or the like, having thickness in the range of 0.5 to 1.0 $\mu$m, and serving as a magnetic path for leading magnetic fields produced at a magnetic recording medium 13 to the MR element 7. Said MR element 7 formed by a deposition film of permalloy has the thickness in the range of 200 to 500 Å, and track width set in the range of about 50 to 200 $\mu$m in a multi-track construction. The conductor layer 5 for applying the biasing magnetic field in the MR element 7 is composed of a film of Al, Cu or Al-Cu alloy, etc. Since the recording wavelength to be actually dealt with is approximately 0.5 $\mu$m at the minimum, the head gap 12 is set in the order of about 0.2 to 0.3 $\mu$m. The conductor layer 5, MR element 7 and upper yoke 11 as described above are formed through the insulating layers 4, 6, and 9 respectively. The lower yoke 3 is prepared by a high permeability magnetic film, for example, of sendust (Fe-Al-Si alloy) or permalloy and the like, and is formed on the substrate 1 made of the non-magnetic material such as crystallized glass of the like having a thermal expansion coefficient approximately equal to that of said lower yoke 3, through an application type $SiO_2$ film 2. This application type $SiO_2$ film 2 is obtained by applying silicon compound, etc. dissolved in an organic solvent or the like onto the substrate 1 by a spinner for subsequent baking. The thickness of the $SiO_2$ film 2 may be controlled by revolutions of a spin coat and concentration of the silicon compound in the solvent, and by this $SiO_2$ film 2, the undulation on the surface of the substrate 1 may be smoothed in a manner similar to the case where an organic material such as PIQ is employed. The surface roughness of the above application type $SiO_2$ film 2 as it is formed on the substrate 1 is up to 10 Å or thereabout as compared with that of the substrate 1 which is in the order of 50 to 200 Å.

Over the application type $SiO_2$ film 2, the lower yoke 3 composed of a high permeability magnetic film is formed by an electron beam deposition process, sputtering or the like. In this case, the undulation on the surface of the substrate 1 is smoothed by the application type SiO$_2$ film 2 as described above, while simultaneously, the high permeability magnetic film that forms the lower yoke 3 thus obtains good magnetic characteristics, since the SiO$_2$ film 2 is superior in the nature or property of the film as a ground coating (e.g. film density, film composition and the like).

After forming the insulating layer of SiO$_2$, Si$_3$N$_4$, Al$_2$O$_3$ or the like is formed on the lower yoke 3 by a P-CVD process or RF sputtering, a conductor layer for impressing a by-pass magnetic field is further formed thereon by the resistance heating process, the electron beam deposition process or RF sputtering. For the conductor layer 5, the film of Al, Cu, Al-Cu alloy, etc. is employed as described earlier, and the Cu film may be processed to desired dimensions through the employment of an etching solution. The etching solution is composed of nitric acid (HNO$_3$)+ammonium persulphate [(NH$_3$)$_2$S$_2$O$_8$]+water (H$_2$O), while the Al film and Al-Cu alloy film can also be processed to required dimensions by using an etching solution composed of potassium hydroxide (KOH)+ammonium persulphate [(NH$_3$)$_2$S$_2$O$_8$]+water (H$_2$O) or phosphoric acid (H$_3$PO$_4$)+nitric acid (HNO$_3$)+acetic acid (CH$_3$COOH)+water (H$_2$O). On the conductor layer 5 thus processed, the insulating layer 6 made of SiO$_2$, Si$_3$N$_4$, Al$_2$O$_3$, etc. is formed by the P-CVD process or RF sputtering.

Furthermore, after formation of the MR element 7 of permalloy (Ni-Fe alloy) and a lead layer 8 made of Al or the like by the resistance heating process, the electron beam deposition process, etc., the insulating layer for the head gap portion 12 is subjected to etching. This insulating layer for the head gap portion 12 may be etched through the employment of a parallel flat plate type dry etching apparatus (RIE), with CHF$_3$ (Freon 23), CF$_4$ (Freon 14), CF$_4$+O$_2$ or CF$_4$+H$_2$ adopted as introducing gas. The MR element 7 has a film thickness in the range of 200 to 500 Å, and is processed into a stripe shape in the range of 5 to 20×50 to 100 μm through either the chemical etching or the sputter etching process.

On the MR element 7 and lead layer 8, the insulating layer 9 is further formed by the P-CVD process or RF sputtering, and the insulating layer for the back yoke portion 10 is subjected to etching by the parallel flat plate type dry etching referred to earlier. Finally, on the insulating layer 9, the high permeability magnetic film of permalloy or the like is formed as the upper yoke 11 by the sputtering process, etc.

Table 1 given below shows a comparison of the magnetic characteristics for the high permeability magnetic films of the conventional thin film magnetic head and the thin film magnetic head according to the present invention.

TABLE 1

| Sample substrate | | Magnetic characteristics of permalloy sputter film. Thickness ≈ 1 μm | Magnetic characteristics of permalloy deposition film Thickness ≈ 300 Å |
|---|---|---|---|
| Conventional sample | Crystallized glass Surface roughness 50–200 Å | Hc = 2.1 oe Hch = 0.5 oe Hk = 2.7 oe | Hc = 4–5 oe Hch = 1–2 oe Hk = — |
| Present invention | Application type SiO$_2$ Surface roughness less than 10 Å P-0300~1000 Å/ Crystallized glass surface roughness 50–200 Å | Hc = 1.2 oe Hch = 0.4 oe Hk = 1.5 oe | Hc = 2.0 oe Hch = 0.2 oe Hk = 4.6 oe |

In Table 1, Hc represents the resistance against the magnetic force in the direction of an easy axis to be magnetized, Hch denotes the resistance in the direction of a difficult axis to be magnetized, and Hk shows the anisotropic magnetic field.

As is seen from Table 1, it is understood that, as compared with the magnetic characteristics of the permalloy film directly formed, by a sputtering or deposition process, on the crystallized glass (PEG) substrate with the surface roughness in the range of 50 to 200 Å, the magnetic characteristics of the permalloy film of the present embodiment which is further formed, by a sputtering or deposition process, on the application type SiO$_2$ film preliminarily formed on the similar substrate, has been improved. More specifically, in the permalloy sputter film (with a thickness of 1 μm), the resistance against magnetic force Hc in the direction of an easy axis to be magnetized is reduced from 2.1 oe to 1.2 oe. Moreover, even in the permalloy deposition film with a thickness of 300 Å which is liable to be subjected to the influence of the surface roughness, the resistance against magnetic force Hc in the direction of an easy axis to be magnetized is also reduced from 4–5 oe to 2.0 oe. This is considered to be attributable to the fact that the undulation on the surface of the substrate has been smoothed by the application type SiO$_2$ film, with simultaneous improvements of the film property as a ground coating.

Furthermore, for the formation of the upper yoke 11 composed of permalloy, influence of the surface undulation at the head gap portion 12 and the back yoke portion 10 will be studied hereinbelow.

According to the present embodiment, since the lower yoke 3 is formed on the application type SiO$_2$ film 2, the surface roughness of the lower yoke 3 is less than 10 Å. Meanwhile, the surface roughness of the head gap portion 12 after formation of the insulating layer 9 is also less than 10 Å. Thus, owing to the fact that the surface roughness of the head gap portion 12 and the back yoke portion 10 is small, a film having favorable magnetic characteristic may be obtained, when the upper yoke 11 composed of the high permeability magnetic film such as permalloy or the like has been formed thereon. Moreover, since the undulation at the head gap portion 12 is generally small, the gap loss may also be reduced by that extent.

As is seen from the foregoing description, according to the thin film magnetic head of the present invention, since the surface roughness has been reduced by forming the application type SiO$_2$ film on the substrate, the upper and lower yokes composed of the high permeability magnetic films may be formed having favorable magnetic characteristics not affected by the undulation on the surface of the substrate and film property, etc., thus providing a thin film MR head having a superior S/N ratio.

Figure 3:
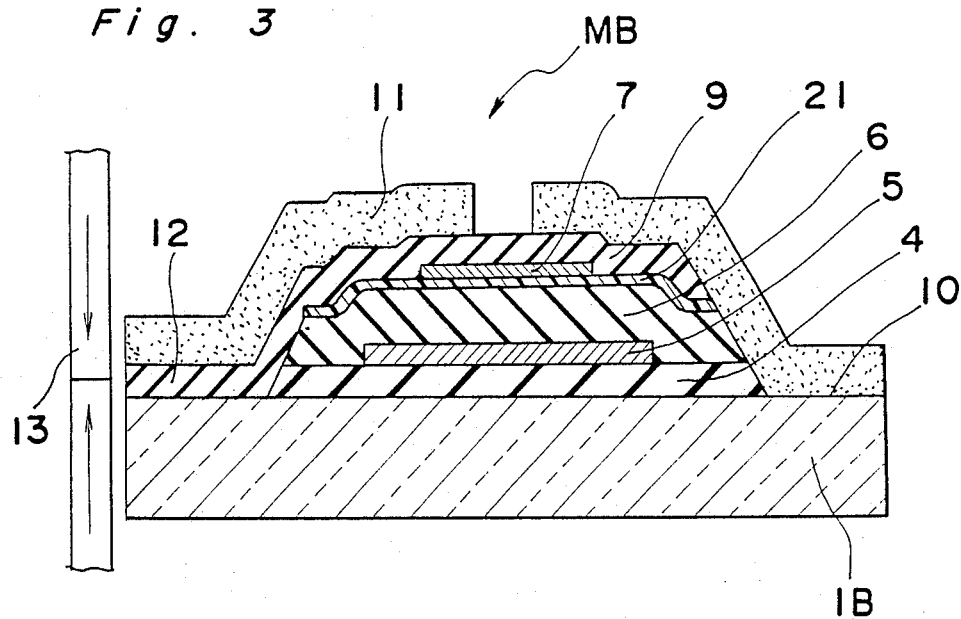
FIG. 3 is a side sectional view of a thin film magnetic head according to a second embodiment of the present invention as taken along the line III—III in FIG. 4.
Figure 4:
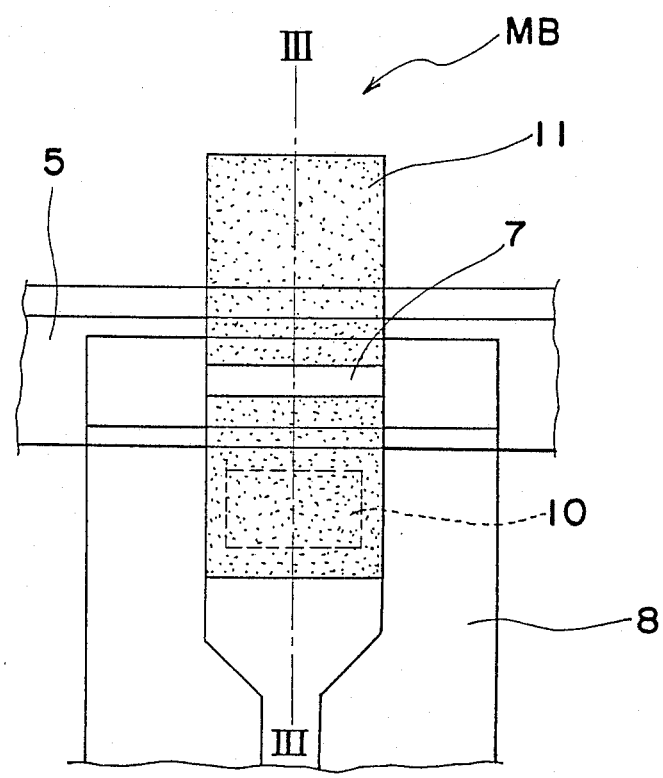
FIG. 4 is a fragmentary top plan view of the thin film magnetic head shown in FIG. 3.

Referring to FIGS. 3 and 4, a yoke type thin film magnetic head or YMR head MB is shown according to a second embodiment of the present invention, with like parts in the embodiment of FIGS. 1 and 2 being designated by like reference numerals.

In the arrangement of FIGS. 3 and 4, the upper yoke 11 composed of a high permeability film of permalloy (Ni-Fe alloy) and the like having a thickness in the range of 0.5 to 1.0 μm serves as the magnetic path for leading magnetic fields produced at the magnetic recording medium 13 to the MR element 7. This MR element 7 formed by the deposition film of permalloy has a thickness in the range of 200 to 500 Å and a track width set in the range of about 50 to 200 μm in a multitrack construction as in the first embodiment of FIGS. 1 and 2. In this embodiment, said MR element 7 is formed on an application type $SiO_2$ film 21 provided on the insulating layer 6. The conductor layer 5 for applying the biasing magnetic field to the MR element 7 is composed of a film of Mo, Cu or Al-Cu alloy etc. The substrate 1B forming the lower yoke in this arrangement is composed of Ni-Zn ferrite or Mn-Zn ferrite. On this substrate 1B, the conductor layer 5 is formed through the insulating layer 4, and further, over this conductor layer 5, the MR element 7 is formed through the insulating layer 6 and the application type $SiO_2$ film 21, while the upper yoke 11 is formed on said MR element 7 through the insulating layer 9.

For the manufacturing of the thin film magnetic head MB as described above, the insulating layer 4 of $SiO_2$, $Si_3N_4$, $Al_2O_3$ or the like is first formed on the substrate 1B by a P-CVD process or RF sputtering, etc. Subsequently, the conductor layer 5 made of Mo, Cu, Al-Cu alloy or the like is further formed on the insulating layer 4 by the resistance heating process, electron beam deposition process, RF sputtering or the like. In order to process the above conductor layer 5 into dimensions as desired, the chemical etching process, sputtering process or ion-milling process should be employed.

By way of example, in the case of chemical etching, the Cu film may be processed to the desired dimensions through employment of an etching solution composed of nitric acid ($HNO_3$)+ammonium persulphate [$(NH_3)_2S_2O_8$]+water ($H_2O$), while the Al-Cu alloy film can also be processed to the required dimensions by using an etching solution composed of potassium hydroxide (KOH)+ammonium persulphate [$(NH_3)_2S_2O_8$)]+water ($H_2O$) or phosphoric acid ($H_3PO_4$)+nitric acid ($HNO_3$)+acetic acid ($CH_3COOH$)+water ($H_2O$). In the case of the sputter etching or ion-milling process, the film of Mo, Cu, Al-Cu or the like may be processed through introduction of Ar gas.

On the conductor layer 5 thus formed, the insulating layer 6 made of $SiO_2$, $Si_3N_4$, $Al_2O_3$, etc. is formed by the P-CVD process or RF sputtering. For the formation of this insulating layer 6, the substrate 1B is raised in temperature to approximately 200° C., thus resulting in roughening on the surface of the conductor layer 5, which is directly reflected on the insulating layer 6 to make its surface roughness in the range of 20 to 100 Å.

Thereafter, the application type $SiO_2$ film 21 is formed on the insulating layer 6. The above application type $SiO_2$ film 21 can be obtained by applying silicon compound, etc. dissolved in an organic solvent or the like onto the insulating layer 6 by a spinner for subsequent baking. The thickness of the $SiO_2$ film 21 may be controlled by revolutions of a spin coat and by the concentration of the silicone compound in a solvent, and by this $SiO_2$ film 21, the undulation on the surface of the insulating layer 6 may be smoothed in the similar manner as in the case where an organic material such as PIQ is employed. The surface roughness of the above application type $SiO_2$ film 21 as it is formed on the insulating layer 6 is less than 10 Å or thereabout as compared with that of the insulating layer 6 which is in the order of 20 to 100 Å.

Over the application type $SiO_2$ film 21, the MR element 7 made of the permalloy deposition film is formed. In this case, the undulation on the surface of the insulating layer 6 is smoothed by the application type $SiO_2$ film 21 as described above, while simultaneously, the permalloy deposition film forming the MR element 7 has good magnetic characteristics, since the $SiO_2$ film 21 is superior in the nature to a ground coating (e.g. film density, film composition and the like).

The MR element 7 has a film thickness in the range of 200 to 500 Å, and is processed into a strip shape in the range of 5 to 20×50 to 100 μm through chemical etching or sputter etching process. Subsequently, the lead layer 8 is formed by the resistance heating process, electron beam deposition process or RF sputtering.

On the MR element 7 and lead layer 8, the insulating layer 9 is further formed by the P-CVD process or RF sputtering, and finally, on the insulating layer 9, the upper yoke 11 of the high permeability magnetic film is formed.

Table 2 given below shows the magnetic characteristics of the permalloy deposition film constituting the MR element 7 of the thin film magnetic head according to the above embodiment of the present invention. It is to be noted here that a glass (#0211) substrate is employed instead of a substrate of Ni-Zn ferrite or Mn-Zn ferrite, and the conductor layer 5 is formed on the glass substrate, with omission of the insulating layer 4, while the insulating layer 6 made of $SiO_2$ is formed on the conductor layer 5, and the application type $SiO_2$ film 21 is provided on said insulating layer 6, with the MR element 7 composed of permalloy deposition film being further formed on the $SiO_2$ film 21.

In Table 2, magnetic characteristics of the permalloy deposition film directly formed on the glass (#0211) substrate are also shown for comparison.

TABLE 2

| Sample | Application type $SiO_2$ film | After baking | Permalloy (Ni—Fe alloy) single film characteristic |
|---|---|---|---|
| $SiO_2$: P-CVD process or RF sputtering Conductor layer: Cu, Mo, Al—Cu. Glass #0211 Surface roughness 2-100 Å | Model P-0300 Film thickness ≈ 1000 Å 300° C. baking | Surface roughness less than 10 Å | Hc = 2.0 oe Hch = 0 Hk = 4.6 oe |
|  | Model P-10503 Film thickness ≈ 4000 Å 300° C. baking | Surface roughness less than 10 Å | Hc = 1.9 oe Hch = 0 Hk = 4.6 oe |
| (Reference) |  |  | Hc = 1.9 oe |

TABLE 2-continued

| Sample | Application type SiO₂ film | After baking | Permalloy (Ni—Fe alloy) single film characteristic |
|---|---|---|---|
| Ni—Fe/Glass (#0211) | | | Hch = 0 |
| | | | Hk = 4.5–5.0 oe |

As is seen from Table 2, the surface roughness of the application type SiO₂ film 21 after the baking is less than 10 Å as compared with the surface roughness of the insulating layer 6 in the range of 20 to 100 Å. As a result, the magnetic characteristics of the permalloy deposition film show approximately the same values as those of the permalloy deposition film directly formed on the glass (#0211) substrate in the resistance against magnetic force Hc in the easy direction to be magnetized, resistance against magnetic force Hch in the difficult direction to be magnetized, and anisotropic magnetic field Hk.

For providing the permalloy deposition film forming the MR element 7, with favorable magnetic characteristics, impurities contained in the SiO₂ film and the film property thereof including composition and density, etc. of the SiO₂ film, has a large influence thereon besides the surface roughness of said SiO₂ film constituting the insulating layer under the MR element 7.

More specifically, as shown in Table 3 given below, even when the SiO₂ film has a surface roughness of less than 10 Å, if it is a film lacking in denseness (processed, e.g. under such conditions as P-CVD process, etching speeds 150 to 200 Å/min., HF 5% aqueous solution, and liquid temperatures at 45° to 50° C.), then the permalloy deposition film cannot obtain favorable magnetic characteristics, and show large values both in the resistance against magnetic force Hc in the direction of the easy axis to be magnetized, and the resistance against magnetic force Hch in the direction of the axis difficult to be magnetized, as compared with magnetic characteristics of the permalloy deposition film formed on the glass substrate (#0211) or dense SiO₂ film (processed, e.g. under such conditions as RF sputtering, etching speeds 40 to 50 Å/min., HF 5% aqueous solution, and liquid temperatures at 45° to 50° C.). However, even if the SiO₂ film lacks in denseness, an improvement of the film property as the ground layer may be achieved by forming the application type SiO₂ film on the above SiO₂ film in an insufficient denseness, and the permalloy deposition film formed on this application type SiO₂ film provides favorable magnetic characteristics approximately equal to those of the permalloy deposition film directly formed on the glass (#2011) substrate.

TABLE 3

| SiO₂/Glass substrate | Application type SiO₂ formation | Single film characteristic of permalloy (Ni—Fe alloy) |
|---|---|---|
| P-CVD process (SiO₂ formation) SiH₄ (10%) = 140 sccM N₂O = 210 sccM Power = 25 W Tsub = 150° C. Surface undulation: less than 10 Å Etching speed = 150–200 Å/min | None | Hc = 3.6–4.3 oe Hch = 0.5–1.0 oe Hk = 4.0–5.0 oe |
| | Model = P-0300 Thickness = 1000 Å 300° C. baking Surface roughness: less than 10 Å | Hc = 1.9–2.0 oe Hch ≈ 0 Hk = 4.6 oe |
| RF sputtering (SiO₂ formation) 100 W, 7 m Torr, | None | Hc = 1.9 oe Hch = 0 Hk = 4.5–5.0 oe |

TABLE 3-continued

| SiO₂/Glass substrate | Application type SiO₂ formation | Single film characteristic of permalloy (Ni—Fe alloy) |
|---|---|---|
| Surface roughness: less than 10 Å Etching speed = 40–50 Å/min (Reference) | | |
| Ni—Fe/Glass (#0211) | | Hc = 1.9 oe Hch = 0 Hk = 4.5–5.0 oe |

Figure 5:
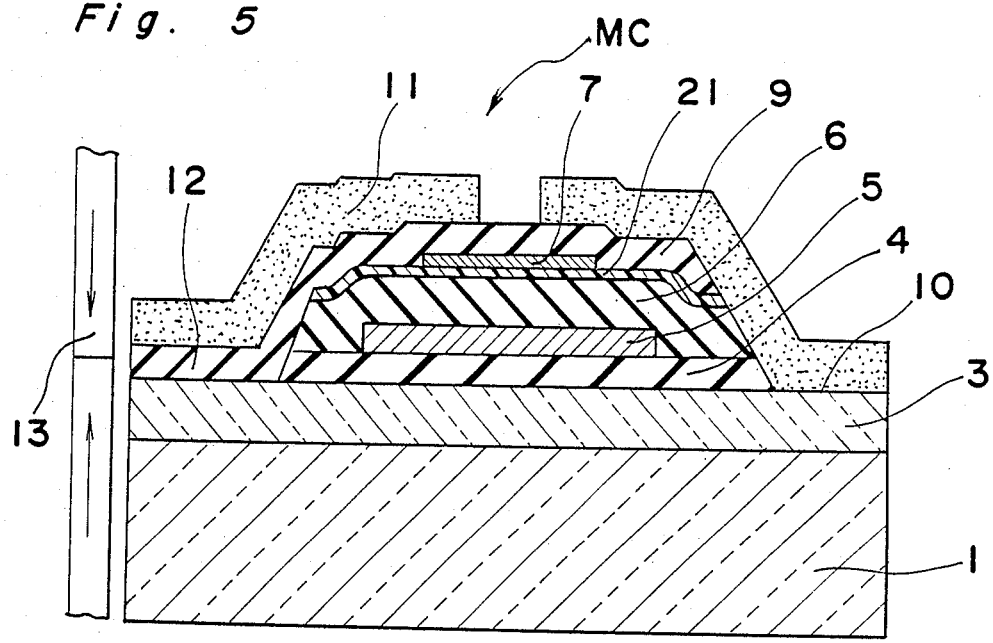
FIG. 5 is a view similar to FIG. 3, which particularly shows a modification thereof.
Figure 6:
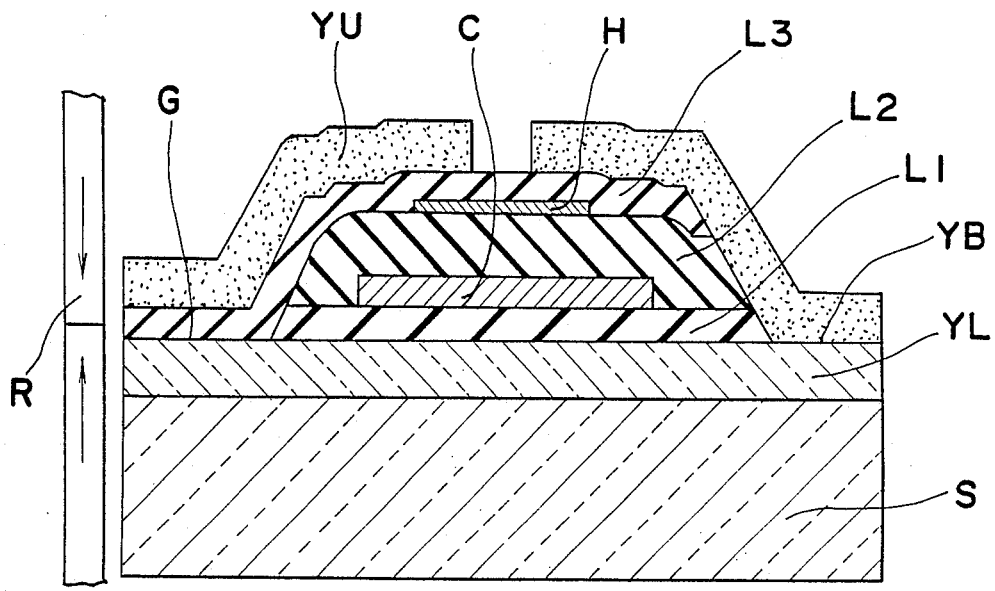
FIG. 6 is a side sectional view showing construction of a conventional thin film magnetic head (already referred to).

Referring further to FIG. 5, a side sectional view of a YMR head MC is shown according to a modification of the magnetic head of FIGS. 3 and 4, as taken in a direction perpendicular to the track width direction of the magnetic recording medium 13.

This thin film magnetic head MC in FIG. 5 includes the non-magnetic substrate 1, a high permeability magnetic film 3 composed of sendust (Fe-Al-Si alloy) film, permalloy (Ni-Fe alloy) film or the like for constituting the lower yoke and formed on said substrate 1 by the electron beam deposition process or sputtering, and the conductor layer 5, MR element 7, upper yoke 11, insulating layers 4, 6 and 9 and the application type SiO₂ film 21 which are further formed, in a similar manner to the embodiment of FIGS. 3 and 4, on said high permeability magnetic film 3. In this case, although the surface roughness of the high permeability magnetic film 3 is also superposed, since the surface roughness of the application type SiO₂ film 21 becomes less than 10 Å, the permalloy deposition film forming the MR element 7 is provided with favorable magnetic characteristics.

It should be noted here that, in the foregoing embodiment, although the present invention has been mainly described with respect to the case where it is applied to the YMR head, the concept of the present invention is not limited in its application to such YMR head alone, but may be readily applied to one-side shield type MR head, non-shield type MR head or the like, in which, through employment of the application type SiO₂ film, permalloy films having favorable magnetic characteristics can be obtained.

As is clear from the foregoing description, according to the present invention, since it is so arranged that the MR element made of the ferromagnetic thin film is formed on the application type SiO₂ film provided on the insulating layer, an MR element having good magnetic characteristics without being affected by the surface roughness of the ground insulating layer and film property may be obtained, and accordingly, MR characteristics ($\Delta\rho/\rho$ characteristics) can be improved to provide thin film magnetic heads with favorable S/N ratio.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A thin film magnetic head for reading a magnetic signal from a magnetic recording medium comprising:
   a first yoke having a first yoke end portion;
   a second yoke being a second yoke end portion;

said first and second yoke end portions forming a magnetic gap therebetween;
said second yoke receiving the magnetic signal from the magnetic recording medium;
magnetic reluctance effect means, for magnetically coupling a magnetic path between said first and second yokes;
a ground layer for supporting said first yoke, said second yoke and said magnetic reluctance effect means; and
application type silicon dioxide film means formed directly on said ground layer, for smoothing surface roughness of said ground layer;
said magnetic reluctance effect means or said first yoke being formed on said application type silicon dioxide.

2. The thin film magnetic head as claimed in claim 1, wherein said application type silicon dioxide film is formed by spinning the silicon dioxide onto said ground layer.

3. The thin film magnetic head as claimed in claim 1, wherein said smooth surface roughness of said ground layer is less than 10 Å.

4. The thin film magnetic head as claimed in claim 1, wherein said smooth surface roughness of said ground layer reduces magnetic resistance in the thin film magnetic head.

5. A thin film magnetic head for receiving a magnetic signal from a magnetic recording medium comprising:
a first yoke;
a second yoke;
said first and second yokes forming a magnetic gap therebetween;
magnetic reluctance effect means, for magnetically coupling a magnetic path formed by said first and second yokes, having unaxial magnetic anisotrophy;
said first yoke, and said second yoke and said magnetic reluctance effect means forming an arrangement for detecting variations in the magnetic signal applied in a direction of a difficult axis to magnetize, said variation being a variation in magnetic resistance;
a substrate, for providing support to said first yoke and said second yoke and said magnetic reluctance effect means;
an insulating layer formed on said substrate; and
application type silicon dioxide film formed on said insulating layer, said application type silicon dioxide film smoothing surface roughness of said substrate.

6. The thin film magnetic head as claimed in claim 5, wherein said application type silicon dioxide film is formed by spinning the silicon dioxide onto said insulating layer.

7. The thin film magnetic head as claimed in claim 5, wherein said magnetic reluctance effect means comprises a ferromagnetic thin film.

8. The thin film magnetic head as claimed in claim 5, wherein said smooth surface of said substrate is less than 10 Å.

9. The thin film magnetic head as claimed in claim 5, wherein said smooth surface roughness of said insulating layer reduces magnetic resistance in the thin film magnetic head.

10. A thin film magnetic head for receiving a magnetic signal comprising:
a substrate;
an application type silicon dioxide film formed on said substrate;
a lower yoke of a high permeability magnetic film formed on said application type silicon dioxide film;
a first insulating layer formed on said lower yoke;
a conductor layer formed on said first insulating layer;
a second insulating layer formed on said conductor layer;
a magnetic reluctance effect element and lead layer formed on said second insulating layer;
a third insulating layer formed on said magnetic reluctance effect element and said lead layer;
an upper yoke formed on said third insulating layer; and
a back yoke portion formed between said upper yoke and said lower yoke;
said upper yoke and said back yoke forming a magnetic gap portion therebetween;
said application type silicon dioxide film smoothing surface roughness of said substrate.

11. The thin film magnetic head as claimed in claim 10, wherein said application type silicon dioxide film is formed by spinning the silicon dioxide onto said substrate.

12. The thin film magnetic head as claimed in claim 10, wherein said magnetic reluctance effect element comprises a ferromagnetic thin film.

13. The thin film magnetic head as claimed in claim 10, wherein said smooth surface of said substrate is less than 10 Å.

14. The thin film magnetic head as claimed in claim 10, wherein said smooth surface roughness of said substrate reduces magnetic resistance in the thin film magnetic head.

15. A thin film magnetic head for receiving a magnetic signal comprising:
a substrate;
a first insulating layer formed on said substrate;
a conductor layer, for applying a magnetic bias, formed on said first insulating layer;
a second insulating layer formed on said conductor layer;
application type silicon dioxide film formed on said second insulating layer;
a magnetic reluctance effect element and lead layer formed on said application type silicon dioxide film;
a third insulating layer formed on said magnetic reluctance effect element and said lead layer;
a first yoke formed on said third insulating layer; and
a second yoke formed between said first yoke and said substrate;
said first yoke and said second yoke forming a magnetic gap therebetween;
said application type silicon dioxide film smoothing surface roughness of said substrate.

16. The thin film magnetic head as claimed in claim 15, further comprising a third yoke, forming between said substrate in said first insulating layer.

17. The thin film magnetic head as claimed in claim 15, wherein said application type silicon dioxide film is formed by spinning the silicon dioxide onto said substrate.

18. The thin film magnetic head as claimed in claim 15, wherein said magnetic reluctance effect element comprises a ferromagnetic thin film.

19. The thin film magnetic head as claimed in claim 15, wherein said smooth surface of said substrate is less than 10 Å.

20. The thin film magnetic head as claimed in claim 15, wherein said smooth surface roughness of said insulating layer reduces magnetic resistance in the thin film head.

* * * * *